United States Patent [19]

Freeman

[11] 4,322,135
[45] Mar. 30, 1982

[54] OPTICAL APPARATUS

[75] Inventor: Michael H. Freeman, Denbigh, Wales

[73] Assignee: Pilkington P. E. Limited, St. Helens, England

[21] Appl. No.: 97,167

[22] Filed: Nov. 26, 1979

[30] Foreign Application Priority Data

Nov. 29, 1978 [GB] United Kingdom ............ 46547/78

[51] Int. Cl.³ .............................................. G02B 17/00
[52] U.S. Cl. .................................. 350/410; 350/144; 350/444
[58] Field of Search ............... 350/444, 442, 410, 144; 250/213 VT; 313/380, 388, 371, 478

[56] References Cited

U.S. PATENT DOCUMENTS

| 2,683,394 | 7/1954 | Polanyi et al. | 350/444 |
| 3,658,412 | 4/1972 | Seaman | 350/444 |
| 4,132,889 | 1/1979 | Groeneweg | 250/213 VT |

FOREIGN PATENT DOCUMENTS

| 1389564 | 4/1975 | United Kingdom . |
| 1433333 | 4/1976 | United Kingdom . |
| 1506614 | 4/1978 | United Kingdom . |

*Primary Examiner*—John K. Corbin
*Assistant Examiner*—Scott J. Sugarman
*Attorney, Agent, or Firm*—F. Eugene Davis, IV

[57] ABSTRACT

Optical apparatus for biocular viewing which is small and of light weight comprises a solid optical element having a face which internally reflects light from an image surface to internally concave reflecting areas which reflect the light back to the face to emerge as two beams travelling towards respective eye positions via a corrector lens. The apparatus can be used in night vision goggles having a single image intensifier tube providing the image surface.

22 Claims, 2 Drawing Figures

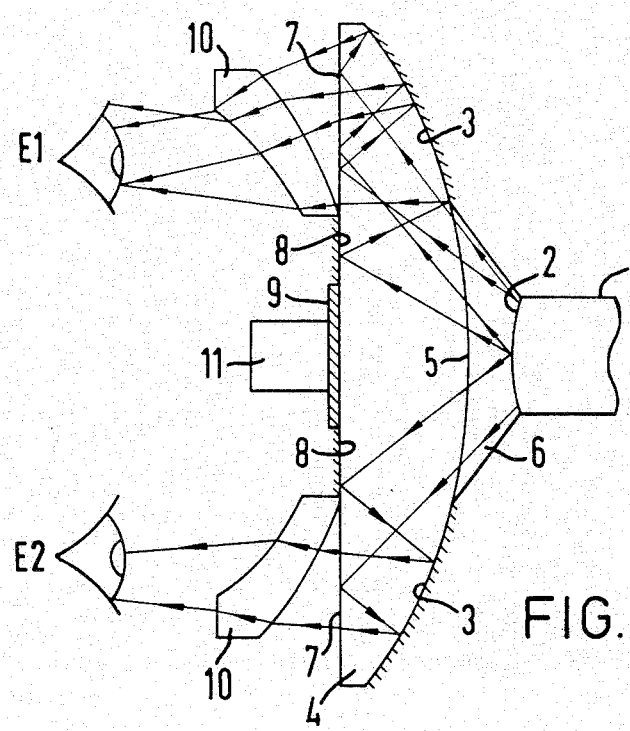
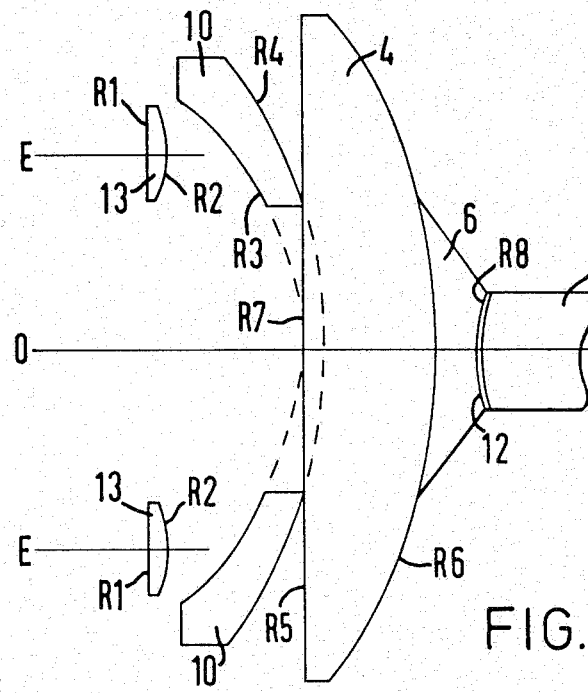

OPTICAL APPARATUS

BACKGROUND OF THE INVENTION

This invention concerns improvements in or relating to optical apparatus and relates more particularly to optical apparatus for biocular viewing. More particularly it relates to optical apparatus for biocular viewing by which an observer looking into the apparatus with his eyes, located at spaced eye positions, can see with both eyes a magnified image of visual information displayed on an image surface.

Optical apparatus for biocular viewing is used, for example, in night vision equipment by which an observer can view with both eyes a magnified image of an object which is usually the face plate of an image intensifier tube. The image intensifier tube receives light from a scene at a low brightness level and, by an amplifying electro-optic system, displays on its face plate an image of the scene of sufficient brightness for viewing by a human observer. Light from the displayed image travels via some form of magnifier to the observer's two eyes. In some applications of biocular viewing apparatus the object can be, instead of an image intensifier tube, a cathode ray tube.

In practice, biocular viewing apparatus does not normally present the whole field of view to both eyes and commonly the observer's left eye sees all of the right-hand field and only a portion of the left while the right eye sees all of the lefthand field and only a portion of the right. However, this has been found satisfactory and preferably to a monocular arrangement by which the observer sees the image with one eye only.

Biocular apparatus has the advantage of needing only one image intensifier or cathode ray tube over binocular apparatus in which two separate tubes and associated optics are provided, one for each eye. However, in biocular apparatus the optics has to meet the requirement of providing satisfactory imagery for the two spaced eye positions from a single object. This can be achieved by the use of a biocular magnifying lens, i.e. a lens specially designed to have an exit pupil large enough to accommodate both eyes and to be adequately corrected for the two spaced eye positions having regard to the angular difference in geometry over the biocular portion of the field of view. Such a lens is disclosed in British Pat. No. 1,389,564. This can also be achieved by the use of a collimating magnifier lens and a prism arrangement which directs the light output from the lens to the two spaced eye positions. Such a system is disclosed in British Pat. No. 1,506,614.

It is sometimes highly desirable that the biocular viewing apparatus should be mounted actually on the observer's head in the manner of goggles. This has the advantage relative to a fixed mounting of permitting head movement while maintaining a view through the apparatus and relative to hand holding of leaving the observer's hands free to perform other functions. Necessary requirements for head mounting are small size and low weight. These same requirements are, however, also desirable for modes other than head mounting, especially for man portable equipments.

The advent of relatively small and lightweight image intensifier and cathode ray tubes has greatly assisted in reducing the size and weight of the equipment and reasonable portability and even head mounting has been achieved. Nevertheless, there is a continuing demand for reduction in size and weight allied with a desire for low cost while, of course, maintaining satisfactory optical performance.

SUMMARY OF THE INVENTION

Broadly according to the present invention there is provided optical apparatus for biocular viewing comprising a solid optical element having a face which internally reflects light towards internally concave reflecting areas from which the light is reflected back to said face to emerge therefrom in two beams travelling towards respective spaced eye positions, and corrector lens means disposed in the light paths to the respective eye positions. With such apparatus an observer with his eyes located at said spaced eye positions can see with both eyes a magnified image of visual information displayed on an image surface from which light enters the solid optical element. The image surface may be cemented to the solid optical element.

Further according to the invention there is provided optical apparatus for biocular viewing comprising means providing a convex image surface, a solid optical element having substantially flat surface areas and internally concave reflecting surface areas facing said substantially flat surface areas and disposed so that light from said image surface is incident on said substantially flat surface areas at angles to be internally reflected thereby towards said internally concave reflecting surface areas and is reflected from the latter back to said substantially flat surface areas for transmission therethrough with refraction thereby towards respective spaced eye positions, and corrector lens means disposed in the light path between each substantially flat surface area and the respective eye position. With such an arrangement an observer with his eyes located at said spaced eye positions can see with both eyes a magnified image of visual information displayed at said convex image surface, the magnification being effected mainly by the power of said concave reflecting surface areas whose inherent field curvature can be accommodated by said convex image surface. Said convex image surface may be cemented to said solid optical element in order to use the full aperture of said internally concave reflecting areas.

The solid optical element is preferably of a material of high refractive index (relative to air), preferably in the range 1.5 to 1.8. Such high refractive index enhances total internal reflection from said substantially flat surface areas. These can be areas of a common substantially planar face of the solid optical element.

The solid optical element may comprise an element having an externally convex face, respective areas of this convex face being rendered internally reflecting, e.g. being silvered, to provide said internally concave reflecting areas. The central area of the convex face is left clear, to permit transmission of light therethrough, and this central area of the convex face may be flat, i.e. planar, having been rendered such for example by grinding and polishing. Conveniently the solid optical element comprises a basically plano-convex element.

The solid optical element may comprise a main element, conveniently said plano-convex element, and a spacer element cemented to said main element, and the image surface may be cemented to the spacer element. The spacer element has a face matching the image surface, i.e. a matching concave face for a convex image surface, and the spacer is of the correct thickness for the location of the image surface. The spacer element may be cemented to the central clear area of said convex face of the main element, the spacer element having a face matching that area which may, as mentioned above, be flat, i.e. planar, the matching face of the spacer element to which it is cemented then also being flat, i.e. planar.

Part of the face of the solid optical element which reflects light towards said internally concave reflecting areas may be rendered internally reflecting, e.g. by silvering, where light does not need to be transmitted through the face, and in particular where total internal reflection breaks down for incident rays from the image surface. Preferably means for absorbing unused light are associated with the solid optical element. Thus, where said substantially flat surface areas are provided by a common substantially planar face, for example the planar face of a basically plano-convex element, the central region of that planar face may be rendered light absorbing for example by means of a light absorbing plate cemented thereto.

The corrector lens means may comprise a common meniscus lens form, concave towards the eye positions, disposed with a part of the lens in each of the respective light paths to the eye positions with the central unused part of the common lens form omitted.

Preferably the curved optical surfaces of the apparatus, and specifically said internally concave reflecting areas, said convex image surface and the corrector lens means curved faces, are all of spherical curvature. However aspheric surfaces could be employed, but with probable increase in the costs of manufacture. Specifically, the corrector lens means in the light path to each respective eye position may be an astigmatic lens element with toric surfaces in each light path, and/or said internally concave reflecting areas could be aspheric.

Said image surface may be provided by an image intensifier tube which may have a convex fibre-optic face plate or by a cathode ray tube which may have a convex face. If the apparatus is required to present to an observer visual information additional to that displayed by such a main display means, then the apparatus may include projection means, such as a lens and prism, for projecting light from an additional display source through said solid optical element to form a focussed real image of an additional display on a main display image surface. The projection means can be mounted adjacent the central area of a substantially planar face providing said substantially flat surface areas, for example the planar face of a plano-convex element as previously mentioned, a hole through which the light can be projected being provided in any light absorbing means in this region.

There may be provided means for deviating by diffraction or refraction light entering the solid optical element and preferably a holographic screen is associated with the image surface to cause divergence of light from the image surface as it enters the solid optical element.

There may be provided a dioptric lens element in each of the light paths from the solid optical element to the respective eye positions.

The present invention further provides night vision goggles having a single image intensifier tube and comprising optical apparatus for biocular viewing as set forth above.

Apparatus in accordance with the invention can be relatively small and light in weight and is particularly, but not exclusively, suitable for headmounting in the manner of goggles.

BRIEF DESCRIPTION OF THE DRAWINGS

An embodiment of optical apparatus for biocular viewing in acordance with the invention will now be described, by way of example, with reference to the accompanying drawings in which:

FIG. 1 is a schematic representation, and

FIG. 2 is a view similar to FIG. 1 illustrating further features.

DESCRIPTION OF THE PREFERRED EMBODIMENTS

The apparatus basically comprises a solid optical element, formed in this embodiment by a main element 4 and a spacer element 6 cemented to the main element 4, the solid optical element having a face, parts of which are indicated by the reference 7, which internally reflects light towards internally concave reflecting areas 3 from which the light is reflected back to the face 7 to emerge therefrom in two beams travelling towards respective spaced eye positions E1 and E2, and corrector lens means 10 disposed in the light paths to the respective eye positions. The light comes from an image surface 2 located adjacent or cemented to the spacer element 6 and the arrangement is such that an observer can see with both eyes a magnified image of visual information displayed at the image surface 2.

The image surface 2 is shown as convex and would normally be the display face of an object 1. The object 1 would usually be an image intensifier tube having a fibre-optic face plate providing the convex display face 2, but could alternatively be a small cathode ray tube with a convex face.

The main optical power is provided by the internally concave reflecting surface areas 3 of the main element 4, which is a basically plano-convex element made of a relatively high refractive index material, for example optical glass have a refractive index Nd of about 1.7.

The convex surface of the main element 4 is clear over a central area 5 bounded by the internally concave surface areas 3 which are rendered internally reflecting, e.g. by silvering. The spacer element 6 is of the same relatively high refractive index material as the main element 4 and has one face matching and cemented to this central area 5 and an opposite face matching the convex display face 2 of the object 1. Thus, light from the display face 2 can be transmitted undeviated through the interface between the spacer element 6 and the central area 5 of the convex face of the main element 4.

In the drawing the central clear area 5 of the convex face of the main element 4 is shown as convex, and the matching face of the spacer element 6 is correspondingly shown as concave. In practice, the convex face of the main element 4 may be flat, i.e. planar, over its central clear area 5, the matching face of the spacer element 6 to which it is cemented also being flat, i.e. planar.

The planar face of the main element 4 provides substantially flat surface areas 7 which serve two optical purposes. Firstly they reflect light coming from the display face 2 on to the internally reflecting concave surface areas 3 which face the substantially flat areas 7. This is achieved by total internal reflection of light from the display face 2 at appropriate angles of incidence and, where that breaks down, by silvered surface areas 8 towards the central region of the planar face. The central region itself is backed by a light absorbing plate 9 cemented thereto to prevent unused light from the display face 2 being reflected back into the main element 4. Secondly, the substantially flat surface areas 7 of the planar face of the element 4 provide a refractive surface for the light reflected from the concave internally reflecting surface areas 3 towards an observer's respective eye positions E1 and E2. Between the eye positions and the surface areas 7 there is interposed a negative correcting lens 10 of common meniscus form concave towards the eye positions, a respective part of the lens 10 being disposed between each eye position and the respective area 7, and the lens 10 having its central unused region omitted to provide a space or aperture between these parts.

The optical function of the apparatus, which will largely be apparent from the above, is briefly as follows. Light from the display face 2 is transmitted through the spacer element 6 and the main element 4 to be internally incident on its planar face. Such light as is incident on the central region of that face is unused and is simply absorbed by the plate 9. Such light as is incident on the silvered surface areas 8 is internally reflected therefrom towards the concave internally reflecting surface areas 3. Such light as is incident on the surface areas 7 outboard of the silvered areas 8 is totally internally reflected therefrom towards the concave internally reflecting surface areas 3. The light incident on the surface areas 3 is internally reflected therefrom back to the respective surface areas 7, at which it is refracted and through which it is transmitted to emerge from the main element 4. It will be seen that the areas 8, which are silvered to effect internal reflection, are not required to transmit light therethrough. The emerging light is then transmitted through the respective parts of the correcting lens 10. The observer can thus see with both eyes E1 and E2 a magnified image of visual information displayed on the display face 2, the magnification being effected mainly by the power provided by the concave reflecting surface areas 3. The inherent field curvature of the surface areas 3 is accommodated by the convex display surface 2. The optics may be arranged to collimate the light received by the eyes, so that the image appears to the observer at infinity, or may be arranged to locate the image at a convenient distance.

As will be apparent from the illustrative light rays shown in the drawing, because of the central obscuration the observer's left eye E1 does not see all of the righthand field but sees all of the lefthand field, and similarly the right eye E2 does not see all of the lefthand field but sees all of the righthand field. This differs from other biocular viewing systems in which the left eye sees all the righthand field and a portion of the left, and the right eye sees all the lefthand field and a portion of the right.

Conveniently the apparatus may employ surfaces of spherical curvature. Thus the convex face of the element 4, and hence the concave internally reflecting surface areas 3, and the refracting faces of the lens 10, may be of spherical curvature, the convex display face 2 also being of spherical curvature. However, as will be appreciated by those skilled in the art, aspheric surfaces could be used. Thus, in particular, the reflecting surface areas 3 could be aspheric and astigmatic lenses having topic surfaces could be used in place of the lens 10. In fact, the use of astigmatic lenses with toric surfaces would give a greater eye relief distance but their cost may be greater because of their non-spherical surfaces.

The correcting lens 10, or the alternative toric lens elements, could be made of a plastics material, a high refractive index not being needed for these components. The main element 4 and the spacer element 6 would, however, normally be made of optical glass because of the high refractive index requirements. In manufacture the main element 4 can be made in the normal way for a plano-convex lens element but before truncation (to remove unused parts of the element and hence reduce its bulk and weight) and silvering (to provide the reflective surface areas 3 and 8) the clear area 5 can be ground flat and polished. In subsequent assembly the spacer element 6 having one ground and polished flat face and one concave face ground and polished to match the convex display face 2, can be cemented to the flat area 5 and the display face 2 can then be cemented to or located adjacent the spacer element. The spacer element is, of course, of the correct thickness for the location of the display face 2.

In the particular embodiment shown and described by way of example precise flatness or planarity is not essential for the planar face of the main element 4, and hence the substantially flat surface areas 7, and this face, and hence these areas, could have a radius of curvature for example down to about 0.5 meters. The terms "substantially flat" and "substantially planar" where used herein are to be construed accordingly, as are references to the planar face of the plano-convex element. By way of particular example, the planar face of the plano-convex element 4 could in practice be externally concave with a radius of curvature slightly shorter than 1 meter.

The convex display face 2 in the particular embodiment shown and described preferably has a radius of curvature in the range from infinity (and the term "convex" when used in this context is to be construed accordingly) down to for example about half the radius of curvature of the internally concave reflecting surface areas 3. There may be associated with the display face 2 a diffractive or refractive screen which effectively assists in spreading the light to fill the aperture of the system. Preferably it is diffractive and in the form of a holographic screen which may comprise a thin hologram adapted to cause divergence of light transmitted through the hologram or a thick (Bragg) dual axis hologram. In either case, light from the display face 2 is transmitted through the holographic screen and deviated thereby into divergent paths. FIG. 2 schematically shows such a holographic screen 12 at the display face 2.

FIG. 2 also shows dioptric lens elements 13 disposed in the light paths from the main element 4 to the respective eye positions E1 and E2. These dioptriclens elements are of positive power, being shown as plano-convex, and are located one between each eye position and the respective correcting lens part 10.

FIG. 2 shows a central optical axis 0 and the in practice omitted central part of the correcting lens form 10 is shown in broken line to indicate the positions of the respective surfaces on that central axis. FIG. 2 also shows respective axes E through the eye positions on which the dioptric lens elements 13 are centred. The respective surfaces are numbered R1 to R8 in the reverse direction to that of light travel. Thus R1 is the surface facing the eye positions of the dioptric lens elements 13 and R8 is the surface of the spacer element 6 which matches and is against the image surface 2 with its holographic screen 12. The substantially flat face of the plano-convex element 4 is indicated as both R5 and R7 since light is incident on that surface twice. It will be seen that, as shown in FIG. 2, the in practice omitted central part of the correcting lens form 10 may extend into the element 4 and the (imaginary central part of) surface R3 of the correcting lens form 10 may coincide on the axis 0 with the surface R5/R7 of the element 4.

A particular example of an embodiment in accordance with FIG. 2 has numerical data as follows, the dimensional units being millimeters. The axial thicknesses/separations are on the central axis 0 except for the thickness of the dioptric lens element 13, i.e. the spacing between surfaces R1 and R2, which is on the axis E. The separation between the surfaces R2 and R3 is on the axis 0 and is the distance between the point where a tangent to surface R2 cuts the axis 0 orthogonally and the point where (the imaginary central part of) surface R3 cuts the axis 0.

| Surface | Radius of Curvature | Axial Thickness/ Separation |
| --- | --- | --- |
| R1 | PLANO | |
| | | 5.08 |
| R2 | −254.00 | |
| | | 20.32 |
| R3 | −54.366 | |
| | | 1.016 |
| R4 | −91.664 | |
| | | −1.016 |
| R5 | −892.07 | |
| | | 21.082 |
| R6 | −83.997 | |
| | | −21.082 |
| R7 | −892.07 | |
| | | 23.764 |
| R8 | +56.444 | |

The main element 4 and the spacer element 6 are of optical glass of refractive index Nd 1.70585 and constringence or V value 30.3. The corrector lens 10 is of optical glass of refractive index Nd 1.80518 and constringence V 25.43. The dioptric lens elements 13 are of optical glass of refractive index Nd 1.62004 and constringence V 36.37. This particular example gives a field of view of 33 degrees and has an Equivalent Focal Length in glass of 49 mm and in air of 28 mm, and has a nominal dioptric setting of −2.

The described apparatus is particularly suitable for head mounting and use as night vision goggles in which the required field of view is about 30° to 40°. The maximum field of view is related to the distance between the eyes and the size of the display face 2. Thus, with apparatus dimensioned to suit the normal human interocular spacing of around 64 mm it has been found that, for adequate image quality over a field of view of about 36°, the diameter of the display face 2 should not exceed about 18 to 19 mm when surfaces of spherical curvature are employed as described above. If desired, the field of view can be improved by use of aspheric surface areas 3 and/or toric lens elements 10 as mentioned previously, but the crucial dimension is still the size of the display face 2 which must not be made too large or the central effectively obscured area becomes too great for satisfactory performance. The size of the display face 2 can, of course, be less than the maximum, e.g. as a practical matter down to about 13 mm for a 36° field of view.

It will be understood, therefore, that the system is not scaleable in the usual way because of the substantially fixed value of the distance between the eyes of a prospective observer.

Although particularly suitable for head mounting, where smallness and lightness in weight are necessary requirements, apparatus in accordance with the invention can find other modes of application notably in the field of man portable equipment, especially having regard to the advent of relatively small cathode ray tubes as suitable objects.

In some applications it may be required to display more than one set of visual information, i.e. additional information to that displayed by the object 1 on its display face 2. Such additional information can be injected by projection of light from an additional display source via a lens and prism arrangement, schematically indicated as 11 in FIG. 1, mounted centrally close to the planar face of the main element 4. The projected light passes through a hole (not shown) in the centre of the light absorbing plate 9 and forms a real image of the additional information on the display face 2 (the lens/prism arrangement 11 being such as to focus the light on to the display face). Light reflected from the display face 2 then travels in the same fashion as described above in relation to light from the main display on the face 2. The observer can thus see with both eyes a magnified image of the additional information. If both the main display and the additional display are switched on, the observer will see superimposed images of both simultaneously but he can, of course, switch off one if he wishes to view only the other.

As previously indicated, the main element 4 and the spacer element 6 would normally be made of optical glass, for example of refractive index 1.7. This lies towards the upper end of the preferred range of 1.5 to 1.8 for the high refractive index (relative to air) material filling the space between the substantially flat surface areas and the concave reflecting surface areas, it being appreciated that the higher the refractive index then the greater the enhancement of total internal reflection from the substantially flat surface areas. However, when a lower degree of total internal reflection is tolerable, the elements 4 and 6 could be made of a material of correspondingly lower refractive index, for example about 1.6, and, as a particular further example, polycarbonate material of refractive index 1.58 could be employed.

I claim:

1. Optical apparatus for biocular viewing comprising a solid optical element having a face with transmissive areas arranged to receive light from an image surface at angles such that the light is internally reflected from said transmissive areas towards internally concave reflecting areas from which the light is reflected back to said transmissive areas through which it is transmitted to emerge from said face in two beams travelling towards respective spaced eye positions, and corrector lens means disposed in the light paths to the respective eye positions whereby a virtual image of at least a portion of said image surface is viewable at each of the respective spaced eye positions.

2. Optical apparatus for biocular viewing comprising means providing a convex image surface, a solid optical element having substantially flat surface areas and internally concave reflecting surface areas facing said substantially flat surface areas and disposed so that light from said image surface is incident on said substantially flat surface areas at angles to be internally reflected thereby towards said internally concave reflecting surface areas and is reflected from the latter back to said substantially flat surface areas for transmission therethrough with refraction thereby towards respective spaced eye positions, and corrector lens means disposed in the light path between each said substantially flat surface area and the respective eye position whereby a virtual image of at least a portion of said image surface is viewable at each of the respective spaced eye positions.

3. Optical apparatus according to claim 2 in which said convex image surface is cemented to said solid optical element.

4. Optical apparatus according to claim 1 comprising means providing an image surface which is cemented to said solid optical element.

5. Optical apparatus according to claim 1 or claim 2 in which said solid optical element is of a material having a refractive index in the range 1.5 to 1.8.

6. Optical apparatus according to claim 2 in which said substantially flat surface areas are areas of a common substantially planar face of said solid optical element.

7. Optical apparatus according to claim 1 or claim 6 in which part of said face is rendered internally reflecting where light does not need to be transmitted through the face.

8. Optical apparatus according to claim 1 or claim 2 in which said solid optical element comprises an element having an externally convex face respective areas of which are rendered internally reflecting to provide said internally concave reflecting areas, a central area of the convex face being clear to permit transmission of light therethrough.

9. Optical apparatus according to claim 8 in which the central area of said convex face is flat.

10. Optical apparatus according to claim 8 in which said solid optical element comprises a basically plano-convex element.

11. Optical apparatus according to claim 1 or claim 2 in which said solid optical element comprises a main element and a spacer element cemented to said main element.

12. Optical apparatus according to claim 3 or claim 4 in which said solid optical element comprises a main element and a spacer element cemented to said main element and in which said image surface is cemented to said spacer element.

13. Optical apparatus according to claim 11 in which said main element has an externally convex face respective areas of which are rendered internally reflecting to provide said internally concave reflecting areas, a central area of the convex face being clear to permit transmission of light therethrough, and said spacer element being cemented to said central area of said convex face.

14. Optical apparatus according to claim 1 or claim 2 comprising light absorbing means associated with said solid optical element to absorb unused light.

15. Optical apparatus according to claim 1 or claim 2 in which said corrector lens means comprises a common meniscus lens form, concave towards the eye positions, disposed with a part of the common lens form in each of the respective light paths to the eye positions and with the central unused part of the common lens form omitted.

16. Optical apparatus according to claim 1 or claim 2 in which the curved optical surfaces are all of spherical curvature.

17. Optical apparatus according to claim 1 or claim 2 in which said corrector lens means comprises an astigmatic lens element with toric surfaces.

18. Optical apparatus according to claim 1 or claim 2 comprising projection means for projecting light through said solid optical element to form a focussed real image of an additional display on a main display image surface.

19. Optical apparatus according to claim 1 or claim 2 comprising means for deviating light entering said solid optical element.

20. Optical apparatus according to claim 19 in which said deviating means comprises a holographic screen.

21. Optical apparatus according to claim 1 or claim 2 comprising a dioptric lens element in each of the light paths from said solid optical element to the respective eye positions.

22. Night vision goggles having a single image intensifier tube and comprising optical apparatus for biocular viewing according to claim 1 or claim 2.

* * * * *

UNITED STATES PATENT AND TRADEMARK OFFICE
CERTIFICATE OF CORRECTION

PATENT NO. : 4,322,135
DATED : March 30, 1982
INVENTOR(S) : Michael H. Freeman

It is certified that error appears in the above–identified patent and that said Letters Patent are hereby corrected as shown below:

Col. 5, line 67, delete "topic" and substitute therefor --toric--.

Signed and Sealed this

Twentieth Day of November 1984

[SEAL]

Attest:

Attesting Officer

GERALD J. MOSSINGHOFF

Commissioner of Patents and Trademarks